Sept. 16, 1924.

E. W. SEAHOLM ET AL

TORQUE TUBE CONNECTION

Filed June 10, 1921

1,508,897

Inventor
E. W. Seaholm and
G. E. Parker
By their Attorneys

Patented Sept. 16, 1924.

1,508,897

UNITED STATES PATENT OFFICE.

ERNEST W. SEAHOLM AND GUY E. PARKER, OF DETROIT, MICHIGAN, ASSIGNORS TO GENERAL MOTORS CORPORATION, OF DETROIT, MICHIGAN, A CORPORATION OF DELAWARE.

TORQUE-TUBE CONNECTION.

Application filed June 10, 1921. Serial No. 476,544.

*To all whom it may concern:*

Be it known that we, ERNEST W. SEAHOLM and GUY E. PARKER, citizens of the United States, and residents of Detroit, county of Wayne, and State of Michigan, have invented certain new and useful Improvements in Torque-Tube Connections, of which the following is a full, clear, concise, and exact description, such as will enable others skilled in the art to which the invention relates to make and use the same, reference being made therein to the accompanying drawings, which form a part of this specification.

The invention relates to driving mechanism for motor vehicles and is particularly concerned with a torque tube mounting and driving shaft connection adapted to permit the separation of the rear axle assembly, including the torque tube and propeller shaft, from the transmission mechanism, including the universal joint and its assembled parts, without necessitating the unshackling of the springs from the rear axle housing.

In the accompanying drawings.

Figure 1:
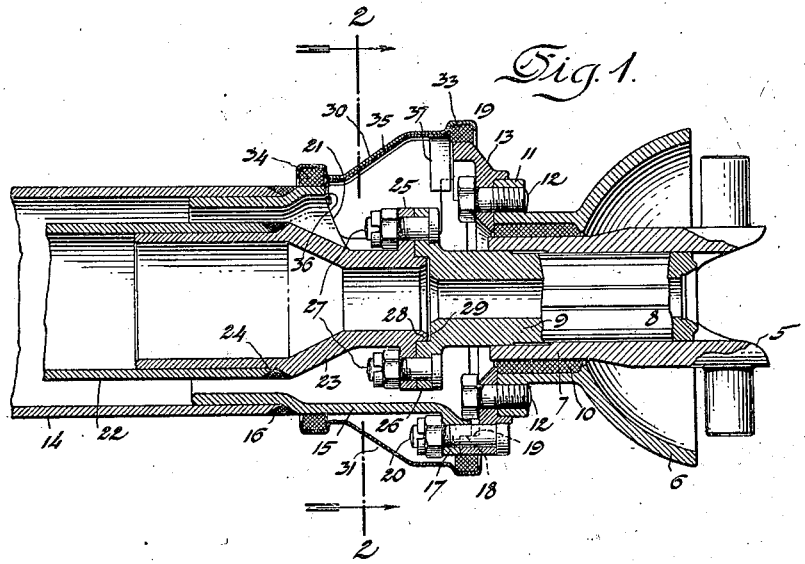
Fig. 1 is a longitudinal sectional view in a vertical plane showing one embodiment of our invention.
Figures 2, 3:
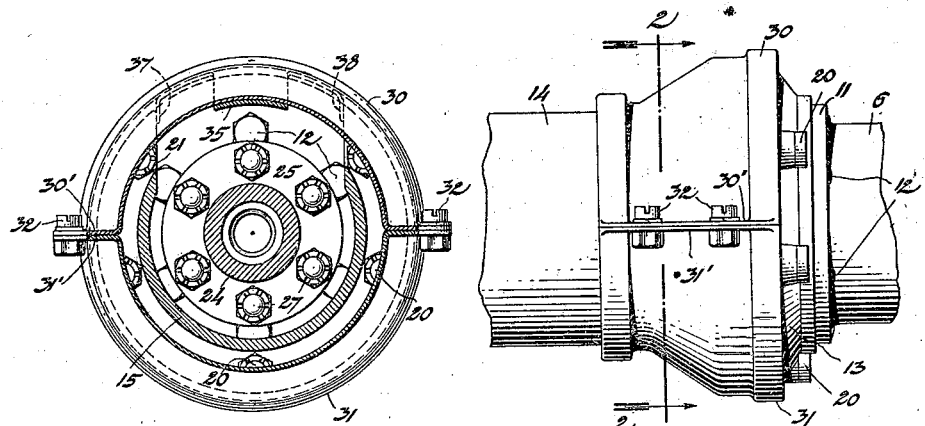
Fig. 2 is a transverse sectional view on line 2—2 of Fig. 1 or Fig. 3.
Fig. 3 is a side elevation showing the exterior of the means for enclosing the driving shaft.

Referring to the drawings, 5 indicates one of the yoke members of a universal joint, which may be of any usual or suitable construction adapted to transmit motion from a motor vehicle engine to the propeller shaft whereby the rear wheels are driven. In driving mechanism of this type the universal joint is usually enclosed within a casing comprising spherical members adapted to permit relative movement between parts of the casing corresponding to that in the universal joint due to the difference in alignment between the main transmission shaft and the propeller shaft. Of these casing members one is shown on the drawing, Fig. 1, and is indicated by the reference numeral 6.

The universal joint yoke 5 is rearwardly extended as indicated at 7, the extension being internally grooved to receive a splined portion 8 of the driving member 9, the members 7 and 9 constituting the usual slip joint employed in this type of apparatus. A packing member 10 of any suitable material, as felt, between the neck of the spherical member 6 and the universal joint extension 7 provides an oil-tight joint to prevent escape of lubricant from the universal joint casing.

The neck of the casing member 6 is provided at the rear end with a flange 11 to which is secured, as by bolts 12, a casing member 13 which provides an extension or flange for the casing member 6 adapted to mate with the forward end of the torque tube as hereinafter described. Obviously the casing member 13 may be formed upon or otherwise rigidly connected to the casing member 6.

A tubular driving shaft housing or torque tube 14 is provided at its forward end with an extension 15 which may be formed integrally with the tube 14 or may, for convenience, be telescoped within the end thereof and welded thereto as illustrated at 16. The extension 15 is outwardly flanged at its forward end, as indicated at 17, which flange is cut away to provide an annular shoulder 18 adapted to fit within a recess 19 formed on the rearward face of the casing member 13, thus providing a centering fit for the two members 13 and 15. Suitable apertures are provided through the member 13 and the flange 17 to receive securing elements, as bolts 20. The upper side of the extension member 15 is cut away as indicated at 21 to provide access to the interior thereof for convenience in assembling and disassembling as hereinafter explained.

Within the housing member or torque tube 14 is a driving shaft 22, ordinarily termed a propeller shaft, which is preferably, as illustrated, of tubular form and connects the transmission mechanism to the differential or other gearing associated with the rear axle assembly. The forward end of the shaft 22 is provided with an extension 23 formed integrally therewith or welded thereto, as indicated at 24, said extension having at its forward end an outwardly extending flange 25. A similar flange 26 is formed upon the rear end of the driving member 9 and the two flanges are provided with suitable apertures for securing means, as bolts 27. The flange 25 may be cut away to leave an extension 28 engaging within a recess 29 formed in the rearward end of the driving member 9 in order to provide a centering fit for the propeller shaft extension and the said driving member.

In order to encase the joint and cover the cut-away portion of the torque tube, a housing may be provided comprising upper and lower sheet metal housing members 30 and 31, semi-circular in transverse cross section, and provided at their mating edges with flanges 30', 31' adapted to receive securing members, as bolts 32. The forward and rearward edges of the housing members 30, 31 are formed with grooves to enclose packing elements 33, 34, respectively, adapted to prevent escape of lubricant and entrance of dust or the like. In order to position the housing properly with reference to the opening 21, a clip 35 may be spot welded or otherwise secured to the interior of the housing member 30, the clip being formed at its rearward end with a tongue 36 adapted to engage the forward edge of the opening 21 and at its forward end with wings 37, 38 adapted to fit within the rearward face of the member 13 and engage at their ends with the sides of the cut-away portion 21 in the extension 15.

In order to detach the rear axle assembly from the universal joint and its associated parts, the housing elements 30, 31 are first removed. Access may then be had through the aperture 21 to the bolts 27 from which the securing nuts may be removed and the driving member 9 may be slipped forwardly as far as is permitted by the casing element 13. The bolts 20 may now be removed and a slight rearward movement of the torque tube and parts movable therewith, which movement will be readily permitted by ordinary spring suspension without unshackling the springs from the rear axle construction, permits the torque tube to be lowered away from the casing element 13 and driving member 9. The cut-away portion 21 permits this lowering movement without interference from the end of member 9 or from the bolts 27 which may still remain in the flange 26. Indeed it is preferable to have these bolts held in position in the apertures in the flange 26 as by providing them with driving fit with the apertures or by a retaining ring or other suitable means, thereby facilitating the reassembly of the driving member with the forward end of the driving shaft.

Variations in details of construction may of course be made without departing from the spirit and scope of the invention and therefore we do not desire to be limited to the specific structure herein described except as required by the language of the appended claims in view of the prior art.

We claim:

1. In driving mechanism, the combination of a driving member, a shaft, means for securing said member to said shaft to rotate therewith, and a housing surrounding said parts and having an opening permitting access to and detachment of said securing means, the engaging portions of the parts being shaped to permit removal of said shaft laterally from said driving member upon removal of said securing means.

2. In driving mechanism, the combination of a driving member, a shaft, means for securing said member to said shaft to rotate therewith, casing means for said member, and a housing surrounding said shaft and secured to said casing means, an opening being provided to permit access to and removal of the shaft securing means, the shaft and housing being removable laterally upon the detachment of said housing from said casing means.

3. In driving mechanism for motor vehicles, the combination of a universal joint member, a driving member slidably connected to said joint member to rotate therewith, a shaft secured to said driving member to rotate therewith, a universal joint casing, and a torque tube surrounding said shaft and secured to said casing, said tube having an aperture permitting access to and removal of the shaft securing means and permitting removal of said tube and shaft laterally upon detachment of said tube from said casing.

4. In driving mechanism for motor vehicles, the combination of a universal joint member, a driving member having splined connection with said joint member, a propeller shaft rigidly secured to said driving member, a casing for said joint member, a torque tube secured to said casing, said tube cut away to provide for access to and removal of said shaft securing means, said parts also arranged to permit removal of said tube and shaft laterally without unshackling the vehicle springs from the rear axle.

5. In driving mechanism for motor vehicles, the combination of a universal joint member, a driving member having splined connection with said joint member, a propeller shaft rigidly secured to said driving member, a casing for said joint member, a torque tube secured to said casing, said tube cut away to provide for access to and removal of said shaft securing means, said parts also arranged to permit removal of said tube and shaft laterally without unshackling the vehicle springs from the rear axle, and detachable casing means adapted to enclose said cut-away portion of the tube.

6. In driving mechanism for motor vehicles, a universal joint member, a driving member slidable but non-rotatable relatively to said joint member and provided with a flange on the rear end, a propeller shaft having a flange on the forward end engageable with said first-mentioned flange, means for securing said flanges rigidly together, a casing surrounding said parts and having an aperture through which access may be had to said securing means, and means for closing said aperture.

7. In motor vehicle driving mechanism, the combination of a universal joint member, a driving member slidable but non-rotatable relatively to said joint member, a propeller shaft, means for securing said driving member to said shaft to rotate therewith, a casing for said universal joint, and a torque tube connected to said casing and surrounding said shaft, said tube having an aperture through which access may be had to said securing means whereby said shaft and driving member may be connected or disconnected without disconnecting said torque tube from said casing.

8. In motor vehicle driving mechanism, the combination of a rotatable universal joint member, a driving member slidably connected to said joint member to rotate therewith, a propeller shaft, the ends of said driving member and shaft adjacent to each other being provided with outwardly projecting flanges adapted to be brought into engagement by sliding movement of said driving member, and means for securing said flanges together for rotation of one part by the other.

In testimony whereof we affix our signatures.

ERNEST W. SEAHOLM.
GUY E. PARKER.